United States Patent Office 3,651,152
Patented Mar. 21, 1972

3,651,152
PROCESS FOR THE ALKOXYLATION OF COMPOUNDS CONTAINING ALCOHOLIC HYDROXYL GROUPS
Wilfried Umbach, Langenfeld, and Werner Stein, Erkrath-Unterbach, Germany, assignors to Henkel & Cie GmbH, Dusseldorf-Holthausen, Germany
No Drawing. Filed Sept. 19, 1969, Ser. No. 859,560
Claims priority, application Germany, Oct. 2, 1968, P 18 00 462.1
Int. Cl. C07c 41/02
U.S. Cl. 260—611 B                        7 Claims

ABSTRACT OF THE DISCLOSURE

This invention relates to an improvement in the process of alkoxylation of compounds containing alcoholic hydroxyl groups by reacting compounds containing hydroxyl groups with alkylene oxides in the presence of alkoxylation catalysts. The said improvement involves the use of a stable carbonium ion as the said alkoxylation catalyst.

THE PRIOR ART

The alkoxylation methods, generally used until now, are based on the reaction of the alkoxylatable compounds with alkylene oxides in the presence of alkaline catalysts, such as sodium hydroxide, sodium methylate, sodium ethylate or metallic sodium, at elevated temperatures and increased pressure. In the case of the alkoxylation of compounds containing alcoholic hydroxyl groups, difficulties are encountered during this method of working, since the alcoholic hydroxyl groups of the starting compound exhibit a lower reactivity in relation to the alkylene oxides than the hydroxyl groups of the ether alcohols formed. In other words, when using 1 mol of alkylene oxide to each hydroxyl group of the alcohol, the pure mono-adduct is not obtained, but in addition to appreciable amounts of unreacted starting alcohols, corresponding higher alkylene oxide adducts are obtained.

Thus, the essential purpose of the reaction to obtain the most complete reaction possible, is not fulfilled. On the other hand, the alkoxylated compounds frequently show an undesirable broad spectrum of oxyalkylene homologs. The indicated difficulties, which are noticeable already during the alkoxylation of primary alcohols, occur in increased measure during the alkoxylation of secondary alcohols. The reactivity of a tertiary hydroxyl group relative to epoxides is so slight in the presence of alkaline catalysts, that an alkoxylation can hardly be attained.

By utilizing acid catalysts in the reaction, the reactivity of the original alcoholic hydroxyl groups becomes slightly improved in relation to alkylene oxide. However, such catalysts have not proved successful in the field of the art. They do allow the work to be conducted at lower temperatures, but at the same time, they promote the formation of undesirable by-products, for example, dioxane or dioxolane during the ethoxylation process. These by-products may constitute 10% to 20% of the reacted ethylene oxide. Moreover, acid catalysts have been found questionable with respect to their corrosivity.

According to another suggestion, the alkoxylation is carried out in a two-stage working method. In the first stage, as much as 4 mols of ethylene oxide were reacted with the alcohol in the presence of an acid catalyst. Then the reaction mixture was neutralized, the unreacted alcohol was removed, and the ether and polyether alcohols were alkoxylated in the presence of an alkaline catalyst. However, it was not possible by means of this method, to obtain a satisfactory reaction of the alcohol used in the first stage of process. Beyond that, this multi-stage process, in particular, the necessary separation of the primary product of the first stage, does not offer any satisfactory solution to the problem.

OBJECTS OF THE INVENTION

An object of the invention is to find a process for alkoxylation on which (a) can be conducted in one single step, and
(b) assures a high degree of reaction of the alcohol used with the alkylene oxide and thus guarantees a narrow spectrum of oxyalkylene homologs in the end product.

Another object of the invention is the development of, in the process of alkoxylation, compounds containing hydroxyl groups by reacting compounds containing hydroxyl groups with epoxides of the formula

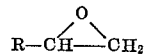

wherein R is a member selected from the group consisting of hydrogen, alkyl having 1 to 2 carbon atoms, hydroxyalkyl having 1 to 2 carbon atoms and haloalkyl having 1 to 2 carbon atoms in the presence of an alkoxylation catalyst the improvement which comprises using compounds having stable carbonium ions as said alkoxylation catalyst.

These and other objects of the invention will become more apparent as the description thereof proceeds.

DESCRIPTION OF THE INVENTION

According to the invention, these objects have been achieved in that compounds having stable carbonium ions under the conditions of the alkoxylation reaction are employed as catalysts for the alkoxylation process.

By stable carbonium ions are meant cations with localized positive charging on carbon atoms, which are capable of forming stable carbonium salts. Such cabonium ions may be derived from the following basic structures:

(1) The positively charged carbon atom is linked in a mesomeric structural form to 1, 2 or 3 radicals of aromatic character and possibly hydrogen or alkyl residues, examples of which are the carbonium ions triphenylmethyl, tris-p-biphenylylmethyl, 1,4-bis-(diphenyl-methyl)-benzene, diphenylmethyl, benzyl, xanthhydryl, or diphenylpolyenyls, (2) The positively charged carbon atom is a component of a condensed aromatic system, for example in the carbonium ion phenalenyl, (3) The positively charged carbon atom is a component of an unsaturated cycloaliphatic ring, which, if desired, may be linked linearly or angularly with further ring systems, examples of which are carbonium ions such as: cycloheptatrienyl (tropylium), benzotropylium, ditropylium, azulenium, heptalenium, triphenylcyclopropenylium, pentaphenylcyclopentadienyl, cyclopentenyl or heptamethylcyclohexadienyl, (4) The positively charged carbon atom is contained in a perhalogenated allyl system, for example in the carbonium ion pentachlorallyl, and (5) The positively charged carbon atom is linked to 3-cyclo-aliphatic radicals, for example, in the carbonium ion tricyclopropylmethyl.

The ring systems contained in the basic structure of the stable carbonium ions described above may themselves be substituted, substituents of the first order being specially suitable, for example amino and alkylamino groups, hydroxyl and ether groups, alkyl and alkenyl radicals and halogen atoms.

The anions present in the stable carbonium salts formed from the stable carbonium ions are especially non-polarizable or only slightly polarizable anions, for example $ClO_4^-$, $BF_4^-$, $AlCl_4^-$, $FeCl_4^-$, $SbCl_6^-$, $SnCl_6^=$. In exceptional cases, for example in the case of tropylium salts, halogen ions, especially bromide, may also be present as the salt ions or anions.

Those of the above-described stable carbonium ions which are mesomerically stabilized are particularly advantageous in their catalytic activity. These include the carbonium ions of the above basic structures described under paragraphs 1 to 4. From the class of the mesomeric stabilized carbonium ions the compounds derived from tri- and di-phenylmethyl and from 7-membered ring structures, are particularly advantageous, especially the carbonium ions triphenylmethyl and tropylium.

The preparation of the stable carbonium ions or their salts to be used as catalysts according to the invention may be carried out by the method known from the literature (see Bethell-Gold, "Carbonium Ions," London-New York, 1967, pages 44–57, J. Org. Chem., 1960, vol. 25, page 1444).

For example, it is possible to start from the compounds with organically bound halogen corresponding to the above basic structures, and split off the halogen by reacting, for example, with silver tetrafluoroborate or antimony pentachloride as the anion. Another possibility for the preparation of carbonium ions or salts consists in splitting off OH ions from suitable carbinols, for example, by reacting the carbinols with borofluoric acid in propionic acid anhydride.

The stable carbonium ions used as catalysts may be added to the reaction mixture in the form of their carbonium salts or may be formed in situ.

The carbonium ions should be present in the reaction mixture in amounts from 0.02 to 5, preferably 0.05 to 2.5% by weight, based on the amount of alcohol used.

The process of alkoxylation according to the invention can be employed for all substances containing hydroxyl groups and offers special advantages in the alkoxylation of substances containing hydroxyl groups in which the acidity of the original hydroxyl group is the same or less than the acidity of the ether and polyether alcohols resulting from the reaction.

Accordingly, mono- and polyhydric alcohols of the aliphatic, cycloaliphatic and alkylaromatic series having 1 to 24 carbon atoms can be employed as starting substance containing hydroxyl groups. These alcohols can be saturated or unsaturated, straight or branched; their alkyl chains or their ring can be substituted or interrupted by hetero atoms. The hydroxyl group to be alkoxylated can have a primary, secondary or tertiary character. As examples of such alcohols, the following are mentioned: alkanols having from 1 to 24 carbon atoms, such as methanol, ethanol, n-propanol, i-propanol, n-butanol-1, n-hexanol-1, n-octanol-1, n-dodecanol-1, n-tetradecanol-1, docosyl alcohol, 2,2,4-trimethylhexanol-6, n-octanol-2, secondary n-tetradecanols, n-pentadecanol-8, 2,5,10-trimethylundecanol-7, tertiary butanol, etc.; haloalkanols having from 2 to 24 carbon atoms, such as 4-chlorbutanol-1; alkenols and alkadienols having from 4 to 24 carbon atoms, such as oleyl alcohol, linoleyl alcohol, etc.; cycloalkanols having from 5 to 24 carbon atoms, such as cyclohexanol, cyclododecanol; phenylalkanols and alkylphenylalkanols having from 7 to 24 carbon atoms, such as benzyl alcohol; alkanediols having from 3 to 24 carbon atoms, such as 1,2-dihydroxypropane, 1,3-dihydroxypropane, hexandiol-1,6, hexadecanediol-1,2, etc.; alkanepolyols having from 3 to 24 carbon atoms, such as glycerin, pentaerythrite, sorbite, mannite, etc.; esters of ricinoleic acid with any of the above mentioned alcohols.

Moreover, alcohol mixtures, primarily of alkanols, can be utilized, for example, amyl alcohol of fermentation, fatty alcohol mixtures containing from 8 to 24 carbon atoms, as they are obtained by hydrogenation of the fatty acid mixtures obtained on saponification of natural fats and waxes according to well known methods, also mixtures of synthetic alcohols which are prepared from petroleum products according to the Ziegler or oxo process. Moreover, mixtures of predominantly secondary alcohols can be utilized, which are prepared by air-oxidation of straight chain paraffins in the presence of boric acid or boric acid anhydride, as well as mixtures which contain primary or secondary alcohols together.

All of the substances containing epoxide groups are suitable to serve as alkylene oxides. Of special interest are those epoxide compounds of the formula

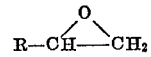

wherein R is a member selected from the group consisting of hydrogen, alkyl having 1 to 2 carbon atoms, hydroxyalkyl having 1 to 2 carbon atoms and haloalkyl having 1 to 2 carbon atoms, for example, ethylene oxide, propylene oxide, butylene oxide. Also substituted epoxides, such as glycide and epichlorohydrin can be used.

These epoxides can be added singly or admixed with one another to the alcohol. They can also be used successively in any order chosen at random.

The amount of the alkylene oxide to be added is likewise optional. For various purposes of utilization such amounts of epoxide can be added, that water-soluble products result therefrom. In this case, the amount of the alkylene oxide to be added is to be adjusted to the carbon number of the alcohol as is well known.

In the case where the products to be prepared are to be rendered water-soluble by, for example, a sulfating process, the number of the alkylene oxide molecules can be correspondingly smaller.

The process of alkoxylation according to the invention can be effected in the usual manner after an addition of the catalyst of the invention.

The temperatures employed in this process range between 0° and 200° C., preferably between 40° and 160° C. The selection of the temperature of the reaction depends on the sensitivity to temperature of the carbonium ion utilized as the catalyst. In the case of the very stable tropylium and triphenylmethyl carbonium ions, the alkoxylation reaction may be carried out at temperatures substantially above 100° C. On the other hand, in the presence of the catalysts of the invention, excellent degrees of conversion are obtained at lower temperatures, which are sometimes necessary when temperature-sensitive carbonium ions, in the form of their salts, are employed. The possibility of working at favorably low temperatures is of a particular advantageous effect with respect to the quality of the end product, since high temperatures, as it is well known in the art, affect the color of the products obtained and, furthermore, are apt to lead to dehydration of the hydroxyl groups.

For the purpose of shortening the reaction duration, the reaction can be executed at increased pressure, employing pressures up to 50 atmospheres. However, the work can also be carried out under normal pressure, since at this standard pressure the reaction proceeds at a satisfactory rate. The process can be conducted in a batch or continuous manner.

The catalyst introduced can either remain in the end product or it can be hydrolytically split after the completed reaction and neutralized with sodium hydroxide.

The raw products, present after the removal of salts possibly precipitated and of the accumulated water, are practically colorless and contain little, if any undesirable by-products. In particular, polyoxyalkylene ether glycols which usually occur during alkoxylation reactions as by-products are present in the end product of the invention only in inconsequential amounts. The raw products display, moreover, such a degree of reaction of the alcohol used, as it had never before been attained with any of the previous alkoxylation processes and which frequently equals that of a practically complete reaction. Due to this high degree of reaction, the products obtained have a narrow spectrum of alkoxylation homologs, which is of special significance for lower alkoxylated products.

These can serve as starting materials for the ether and polyether sulfates which are an important tenside class. It is of importance that, in the sulfating process conducted for the preparation of these ether and polyether sulfates, if at all possible, no hydroxy groups having various reactivities are present in the starting material. Their presence would be of particular disadvantage, if the difference in the acidities between the starting compound to be reacted and containing hydroxyl groups and the ether or polyether alcohol resulting from the reaction with an alkylene oxide were especially marked as, for example, in the presence of secondary alcohols in addition to their ether and polyether alcohols.

The following examples are illustrative of the practice of the invention. They are not, however, to be deemed limitative in any respect.

EXAMPLE 1

The apparatus employed for the experiments consisted of a three-neck flask, which was equipped with stirrer, thermometer, gas inlet and gas outlet devices and thermostatically controlled. Into this flask, 214 gm. (1 mol) of a mixture of isomers of sec.-n-tetradecanols were introduced and, under an atmosphere of nitrogen, admixed with 0.6 gm. (0.28% by weight) of tropylium fluoborate. After the mixture had been heated to the desired temperature of 80° C. to 95° C. the nitrogen was expelled from the apparatus by being rinsed for 2 minutes with ethylene oxide. Then a stock bottle, containing 88 gm. (2.0 mols to 1 mol of alcohol used) of ethylene oxide, was connected to the apparatus, and the ethylene oxide was fed into the said apparatus at a rate which was determined by its being completely taken up in the reaction mixture. The amount of ethylene oxide used was completely absorbed after 1½ hours. The apparatus was rinsed with nitrogen, the catalyst was hydrolytically decomposed and neutralized with sodium hydroxide. The water accumulated during this operation was distilled in vacuo, and the precipitated salts were removed by filtration. The resultant raw product was practically colorless, and its content of unreacted alcohol was determined by gas chromatography. The product contained 25% by weight of unreacted starting alcohol. The polyglycol content was 0.5%.

EXAMPLE 2

In an ex-protected autoclave 214 gm. (1.0 mol) of an isomeric mixture of sec. n-tetradecanols were mixed with 0.6 gm. (0.28% by weight) of triphenylmethylcarbonium fluoroborate in an atmosphere of nitrogen. After evacuating and scavenging the autoclave with nitrogen three times, the mixture was heated to 120°. Then 88 gm. (2.0 mols) of ethylene oxide were introduced under pressure by means of nitrogen from a second autoclave cooled with an ice-salt mixture. The pressures thereby used were in the range from 0.8 to 13.8 atmospheres. The increase in pressure was effected stepwise so as to keep the temperature of the reaction mixture between 120° and 122°. The amount of ethylene oxide added was taken up by the reaction after 6 hours. The crude product was worked up as in Example 1. Determination by gas chromatography gave an unreacted alcohol content of 24%. The product contained 1.0% of polyglycol.

EXAMPLE 3

The arrangement and operation of the experiment were the same as in Example 2. 64.3 gm. (0.3 mol) of an isomeric mixture of sec. n-tetradecanols were used for the reaction with 198 gm. (4.5 mols) of ethylene oxide in the presence of 1.3 gm. (2.0% by weight) of triphenylmethylcarbonium fluoroborate. The reaction temperautre was 70° to 130° C. and the pressure was between 0.8 and 10.6 atmospheres. The reaction was completed after 5¼ hours. The reaction mixture was worked up as in Example 1 and the product examined by gas chromatography. No unreacted alcohol could be detected.

EXAMPLE 4

214.4 gm. (1.0 mol) of n-tetradecanol-1 were reacted in the process of Example 1 with 88 gm. (2.0 mols) of ethylene oxide in the presence of 0.6 gm. (0.28% by weight) of tropylium fluoroborate. The temperature of the reaction mixture was kept between 76° C. and 88° C. The reaction was completed after 2 hours. The crude product, worked up as in Example 1, was recovered by distillation. It contained 12% of still unreacted n-tetradecanol-1. The polyglycol content was 1.6%.

EXAMPLE 5

130 gm. (1.0 mol) of n-octanol-2 were mixed with 0.3 gm. (0.24% by weight) of triphenylmethylcarbonium fluoroborate and the mixture was heated to 74° C. to 78° C. in the experimental arrangement described in Example 2. 44 gm. (1.0 mol) of ethylene oxide were introduced for the reaction within the range of pressure from 0.7 to 13.5 atmospheres. The reaction was completed after 5¼ hours. The crude product was worked up as in the preceding examples and examined by gas chromatography. Its content of unreacted n-octanol-2 was 24%. The polyglycol content amounted to 1.0%.

EXAMPLE 6

In the apparatus according to Example 1, 130 gm. (1 mol) of n-octanol-2 were treated with 0.8 gm. (0.62% by weight) of tropylium fluoroborate in an atmosphere of nitrogen and the mixture was heated to 85° C. Then 72 gm. (1 mol) of butylene oxide were added through a dropping funnel. The temperature was maintained within the range of 85° C. to 95° C. during the reaction, and the reaction time amounted to 1¾ hours. The reaction product was worked up in the manner described in the previous examples and analyzed. The content of unreacted n-octanol-2 was 22%.

EXAMPLE 7

In an experimental arrangement as in Example 6, 91 gm. (0.7 mol) of n-octanol-1, in the presence of 0.4 gm. (0.43% by weight) of tropylium fluoroborate, were reacted with 104 gm. (1.4 mols) of glycide. The reaction temperature was between 85° C. and 100° C. After a reaction period of 2¼ hours a product was obtained which was practically colorless and had an unreacted alcohol content of 11%.

EXAMPLE 8

In the experimental arrangement described in Example 1, 112 gm. (1.5 mols) of tert-butanol, in the presence of 0.5 gm. (0.45% by weight) of tropylium fluoroborate, were reacted with 132 gm. (3.0 mols) of ethylene oxide, at a temperature of 75° C. to 83° C. for a reaction time of 1 hour. After working up the raw product, the content of unreacted alcohol was 10%.

EXAMPLE 9

Similarly as in Example 1, using 0.28% by weight, based on the alcohol of tropylium fluoroborate, 268.5 gm. (1 mol) of oleyl alcohol were reacted with 88 gm. (2 mols) of ethylene oxide at temperatures between 75° and 80° C. The reaction was completed after 2 hours. The reaction product was worked up and analyzed as in Example 1. The content of unreacted oleyl alcohol was 13% and the polyglycol content was 1.5%.

EXAMPLE 10

Samples of 1 mol each of n-tetradecanol-1 and an isomeric mixture of sec. n-tetradecanols were reacted with 2 mol of ethylene oxide in each case in the presence of 0.6 gm. (0.25% by weight) based on the alcohol, of tropylium fluoroborate at temperatures between 76° and 95° C. under normal pressure, in the way described in Example 1. The same alcohols were ethoxylated in the presence of an alkaline catalyst, as a comparison, about 2 mols of ethylene oxide being used per mol of alcohol.

The experimental apparatus described in Example 1 was charged with the alcohol concerned and a 30% solution of sodium methylate in methanol. The amount of sodium methylate solution was so measured that 0.2% to 0.3% by weight of sodium, based on the amount of alcohol in the reaction mixture, was present. The methanol was removed in vacuo and the ethoxylation was carried out in the usual way at temperatures between 140° C. and 150° C.

In a further series of comparative experiments, the said alcohols were ethoxylated in the presence of an acid catalyst. In this case 0.2% to 0.3% by weight, based on the amount of alcohol used, of $BF_3$ (in the form of $BF_3$-etherate) was added to the alcohol and the ethoxylation was carried out at temperatures between 0 and 50° C. according to the method given in the literature. The amount of ethylene oxide used was again 2 mols of ethylene oxide per mol alcohol. After the end of the reaction, the respective products formed were examined analytically for their quantitative composition. The results obtained are grouped in the following table.

| Starting alcohol | Catalyst | Temperature of reaction, °C. | Percent (wt.) of unreacted alcohol in the end product |
|---|---|---|---|
| n-Tetradecanol-1 | Tropylium fluoroborate | 76-95 | 12 |
| Do | Sodium methylate | 140-150 | 29 |
| Do | $BF_3$-etherate | 0-50 | 17 |
| Sec. n-tetradecanol (isomeric mixture) | Tropylium fluoroborate | 76-95 | 25 |
| Do | Sodium methylate | 140-160 | 63 |
| Do | $BF_3$-etherate | 0-50 | 34 |

EXAMPLE 11

The addition of 1 mol of ethylene oxide to 1 mol of n-octanol-2 was carried out in the manner described in Example 5, and for comparison with the method according to Example 10, in the presence of basic and acid catalysts. The following results were obtained:

| Catalyst | Temperature of reaction, °C. | Percent (wt.) of unreacted alcohol in the end product |
|---|---|---|
| Triphenylmethylcarbonium fluoroborate | 74-78 | 24 |
| Sodium methylate | 140-150 | 74 |
| $BF_3$-etherate | 0-50 | 38 |

The advantages obtained by the process of the invention consist essentially in that, with the catalyst to be employed according to the invention, a high reaction degree of the alcohol and, in relation thereto, a narrow spectrum of alkoxylation homologs of the adducts can be obtained. Therefore, the ether and polyether adducts are available in greater yields in the reaction mixture and the reaction mixture can be used as a raw product, that is to say, without separation from the unreacted starting material or without additional processing. This applies in particular to the alkylene oxide adducts of the secondary and tertiary alcohols which, according to the methods previously employed, could not be alkoxylated to a satisfactory degree.

Additional advantages of the process of the invention are the possibility of working at relatively low temperatures, which results in an improvement of color and greater purity of the products, as well as the possibility of working under normal pressure which allows a decrease in the expenditures concerning the apparatus used.

The preceding specific embodiments are illustrative of the practice of the invention. It is to be understood, however, that other expedients, either explained above or known in the art, can be employed without departing from the spirit of the invention.

We claim:

1. A process for alkoxylation of compounds containing alcoholic hydroxyl groups which comprises reacting a compound containing alcoholic hydroxyl groups selected from the group consisting of alkanols having from 1 to 24 carbon atoms, haloalkanols having from 2 to 24 carbon atoms, alkenols having from 4 to 24 carbon atoms, alkadienols having from 4 to 24 carbon atoms, cycloalkanols having from 5 to 24 carbon atoms, phenylalkanols having from 7 to 24 carbon atoms, alkylphenylalkanols having from 8 to 24 carbon atoms, alkanediols having from 3 to 24 carbon atoms and alkanepolyols having from 3 to 24 carbon atoms with an epoxide of the formula

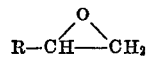

wherein R is a member selected from the group consisting of hydrogen, alkyl having 1 to 2 carbon atoms, hydroxyalkyl having 1 to 2 carbon atoms and chloroalkyl having 1 to 2 carbon atoms, under alkoxylation conditions at temperatures between 0° C. and 200° C. in the presence of from 0.02 to 5% by weight, based on the weight of said compound containing hydroxyl groups of a mesomerically stable carbonium ion selected from the group consisting of triphenylmethyl, tris-p-biphenylmethyl, 1,4-bis-(diphenylmethyl)-benzene, diphenylmethyl, benzyl, xanthydryl, cycloheptatrienyl, benzotropylium, ditropylium, azulenium, heptalenium, triphenylcyclopropenylium, pentaphenylcyclopentadienyl, cyclopentyl and heptamethylcyclohexadienyl present as a stable carbonium salt of a halogeno-complex anion selected from the group consisting of $BF_4^-$, $FeCl_4^-$, $AlCl_4^-$, $SbCl_6^-$ and $SnCl_6^=$; and recovering said alkoxylated compounds.

2. The process of claim 1 wherein said mesomerically stable carbonium ions are selected from the group consisting of diphenylmethyl carbonium ion, triphenylmethyl carbonium ion and cycloheptatrienyl carbonium ion.

3. The process of claim 1 wherein said stable carbonium salt is tropylium fluoroborate.

4. The process of claim 1 wherein said stable carbonium salt is triphenylmethylcarbonium fluoroborate.

5. The process of claim 1 wherein said temperatures are between 40° C. and 160° C.

6. The process of claim 1 wherein said reaction mixture is maintained at atmospheric pressure.

7. The process of claim 1 wherein said reaction mixture is maintained at elevated pressures up to 50 atmospheres.

References Cited

UNITED STATES PATENTS

| 2,870,220 | 1/1959 | Carter | 260—615 B |
| 3,291,845 | 12/1966 | Longley et al. | 260—615 B |
| 3,030,426 | 4/1962 | Moseley et al. | 260—615 B |
| 2,807,651 | 9/1957 | Britton et al. | 260—615 B |

FOREIGN PATENTS

| 1,411,265 | 8/1965 | France | 260—615 B |

OTHER REFERENCES

Gaylord: Polyethers, Part I, Interscience, New York, 1963, pp. 110-111.

Encylopedia of Polymer Science & Technology, John Wiley & Sons, New York, vol. 3, pp. 39-43, 1965.

HOWARD T. MARS, Primary Examiner

U.S. Cl. X.R.

260—410, 615 B